US012700994B2

(12) United States Patent
Han et al.

(10) Patent No.: US 12,700,994 B2
(45) Date of Patent: Aug. 4, 2026

(54) APPARATUS, METHOD, AND PROGRAM PRODUCT FOR PRODUCING SYNTHETIC FAKE DATA

(71) Applicant: Lenovo (Beijing) Limited, Beijing (CN)

(72) Inventors: Chunlin Han, Beijing (CN); Igor Stolbikov, Apex, NC (US); Scott Li, Cary, NC (US); Christian De Hoyos, Oceanside, CA (US)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 18/252,342

(22) PCT Filed: Aug. 23, 2022

(86) PCT No.: PCT/CN2022/114142
§ 371 (c)(1),
(2) Date: May 9, 2023

(87) PCT Pub. No.: WO2024/040425
PCT Pub. Date: Feb. 29, 2024

(65) Prior Publication Data
US 2025/0184119 A1      Jun. 5, 2025

(51) Int. Cl.
*H04L 9/08*          (2006.01)
*G06F 21/60*        (2013.01)

(52) U.S. Cl.
CPC .......... *H04L 9/0825* (2013.01); *G06F 21/606* (2013.01)

(58) Field of Classification Search
CPC ............................ H04L 9/0825; G06F 21/606
See application file for complete search history.

(56) References Cited

U.S. PATENT DOCUMENTS

| | | | | |
|---|---|---|---|---|
| 10,592,635 B2 * | 3/2020 | Sha | .......................... | G06F 30/27 |
| 11,416,712 B1 * | 8/2022 | Dizche | ................ | G06F 18/2413 |
| 11,562,252 B2 * | 1/2023 | Walters | .................. | G06N 3/045 |
| 11,574,100 B2 * | 2/2023 | Kale | ...................... | G06F 3/0658 |
| 11,610,139 B2 * | 3/2023 | Bucher | ................ | G06N 3/0442 |

(Continued)

FOREIGN PATENT DOCUMENTS

| | | |
|---|---|---|
| CN | 110830514 A | 2/2020 |
| CN | 113051604 A | 6/2021 |
| CN | 113281998 A | 8/2021 |

OTHER PUBLICATIONS

Alberto Mozo et al., Synthetic flow-based cryptomining attack generation through Generative Adversarial Networks (Year: 2022).*

(Continued)

*Primary Examiner* — Sharon S Lynch
(74) *Attorney, Agent, or Firm* — Kunzler Needham Hilton

(57)          ABSTRACT

Apparatuses, methods, and program products are disclosed for producing synthetic fake data. One apparatus includes at least one processor and a memory that stores code executable by the at least one processor. The code is executable by the processor to receive, by use of the at least one processor, real data to be protected. The code is executable by the processor to add noise to the real data to produce synthetic fake data. The code is executable by the processor to encrypt the synthetic fake data using an encryption key.

17 Claims, 8 Drawing Sheets

(56) References Cited

U.S. PATENT DOCUMENTS

| | | | | |
|---|---|---|---|---|
| 11,715,004 | B2 * | 8/2023 | Zhang | G06N 3/08 706/20 |
| 2019/0370435 | A1 * | 12/2019 | Sha | G06N 3/0455 |
| 2021/0035563 | A1 * | 2/2021 | Cartwright | G06N 3/084 |
| 2021/0397972 | A1 * | 12/2021 | Walters | G06N 3/047 |
| 2022/0027490 | A1 * | 1/2022 | Rahmat | G06F 16/22 |
| 2022/0027709 | A1 * | 1/2022 | Honkala | G06N 3/08 |
| 2022/0188645 | A1 * | 6/2022 | Nia | G06N 3/09 |
| 2022/0245769 | A1 * | 8/2022 | Galeotti | G06N 3/08 |
| 2022/0358373 | A1 * | 11/2022 | Bucher | G16C 20/50 |
| 2023/0010686 | A1 * | 1/2023 | Lesh | G16H 50/70 |
| 2023/0156493 | A1 * | 5/2023 | Roessler | H04B 17/0087 370/252 |
| 2023/0297853 | A1 * | 9/2023 | Bucher | G16B 40/20 706/45 |

OTHER PUBLICATIONS

Peter Fenner et al., Privacy-Preserving Gaussian Process Regression—A Modular Approach to the Application of Homomorphic Encryption (Year: 2020).*

Hanchi Ren et al., GRNN: Generative Regression Neural Network—A Data Leakage Attack for Federated Learning (Year: 2021).*

Shagufta Mehnaz et al., Privacy-Preserving Real-time Anomaly Detection using Edge Computing (Year: 2020).*

Raban Iten et al., Discovering physical concepts with neural networks pp. 1-18 (Jan. 23, 2020) (Year: 2020).*

Alvaro Figueira et al., Survey on Synthetic Data Generation, Evaluation Methods and GANs, pp. 1-41 (Aug. 2, 2022) (Year: 2022).*

Shayan Hassantabar et al., TUTOR: Training Neural Networks Using Decision Rules as Model Priors, in IEEE Transactions on Computer-Aided Design of Integrated Circuits and Systems, vol. 42, No. 2 (first published May 31, 2022) (Year: 2023).*

Ángel González-Prieto et al., Improving the quality of generative models through Smirnov transformation (Nov. 1, 2021) (Year: 2021).*

PCT/CN2022/114142, "Notification of Transmittal of the International Search Report and the Written Opinion of the International Searching Authority, or the Declaration", International Searching Authority, Nov. 25, 2022, pp. 1-9.

* cited by examiner

200

300

500

600

700

702 —

704 ——

800

802 —

804 ——

1000

APPARATUS, METHOD, AND PROGRAM PRODUCT FOR PRODUCING SYNTHETIC FAKE DATA

FIELD

The subject matter disclosed herein relates to information handling devices and more particularly relates to producing synthetic fake data.

BACKGROUND

Description of the Related Art

Information handling devices, such as desktop computers, laptop computers, tablet computers, smart phones, optical head-mounted display units, smart watches, televisions, streaming devices, etc., are ubiquitous in society. These information handling devices may be used for performing various actions, such as transmitting sensitive private data. It may be undesirable to transmit sensitive private data.

BRIEF SUMMARY

An apparatus for producing synthetic fake data is disclosed. A method and computer program product also perform the functions of the apparatus. In one embodiment, the apparatus includes at least one processor and a memory that stores code executable by the at least one processor. The code, in various embodiments, is executable by the processor to receive, by use of the at least one processor, real data to be protected. The code, in certain embodiments, is executable by the processor to add noise to the real data to produce synthetic fake data. The code, in some embodiments, is executable by the processor to encrypt the synthetic fake data using an encryption key.

In some embodiments, the apparatus includes a transmitter to transmit the encrypted synthetic fake data. In one embodiment, the code executable by the at least one processor to add the noise further includes code executable by the at least one processor to form a vector of means and a vector of standard deviations from the real data.

In various embodiments, the vector of means and the vector of standard deviations are formed using a variational autoencoder. In some embodiments, the code executable by the at least one processor to add the noise to the real data to produce the synthetic fake data includes code executable by the at least one processor to add the noise using a random vector.

A method for producing synthetic fake data, in one embodiment, includes receiving, by use of at least one processor, real data to be protected. In certain embodiments, the method includes adding noise to the real data to produce synthetic fake data. In some embodiments, the method includes encrypting the synthetic fake data using an encryption key.

In some embodiments, the method includes transmitting the encrypted synthetic fake data. In various embodiments, the noise comprises Gaussian noise. In one embodiment, adding the noise includes forming a vector of means and a vector of standard deviations from the real data. In some embodiments, the noise is added to the vector of means and to the vector of standard deviations. In certain embodiments, encrypting the synthetic fake data using the encryption key includes separately encrypting the vector of means and the vector of standard deviations after the noise is added to the vector of means and the vector of standard deviations.

In some embodiments, the vector of means and the vector of standard deviations are formed using a variational autoencoder. In various embodiments, the method includes training the variational autoencoder. In certain embodiments, adding the noise to the real data to produce the synthetic fake data includes adding the noise using a random vector. In some embodiments, the encryption key includes a private encryption key. In various embodiments, the encryption key includes a public encryption key.

In one embodiment, a method for producing synthetic fake data includes receiving, by use of at least one processor, encrypted synthetic fake data. The method, in various embodiments, includes decrypting the encrypted synthetic fake data to produce decrypted synthetic fake data. The method, in some embodiments, includes removing noise from the decrypted synthetic fake data to produce synthetic fake data.

In certain embodiments, the noise includes Gaussian noise. In one embodiment, the encrypted synthetic fake data includes a vector of means and a vector of standard deviations. In certain embodiments, the noise is removed from the vector of means and the vector of standard deviations.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
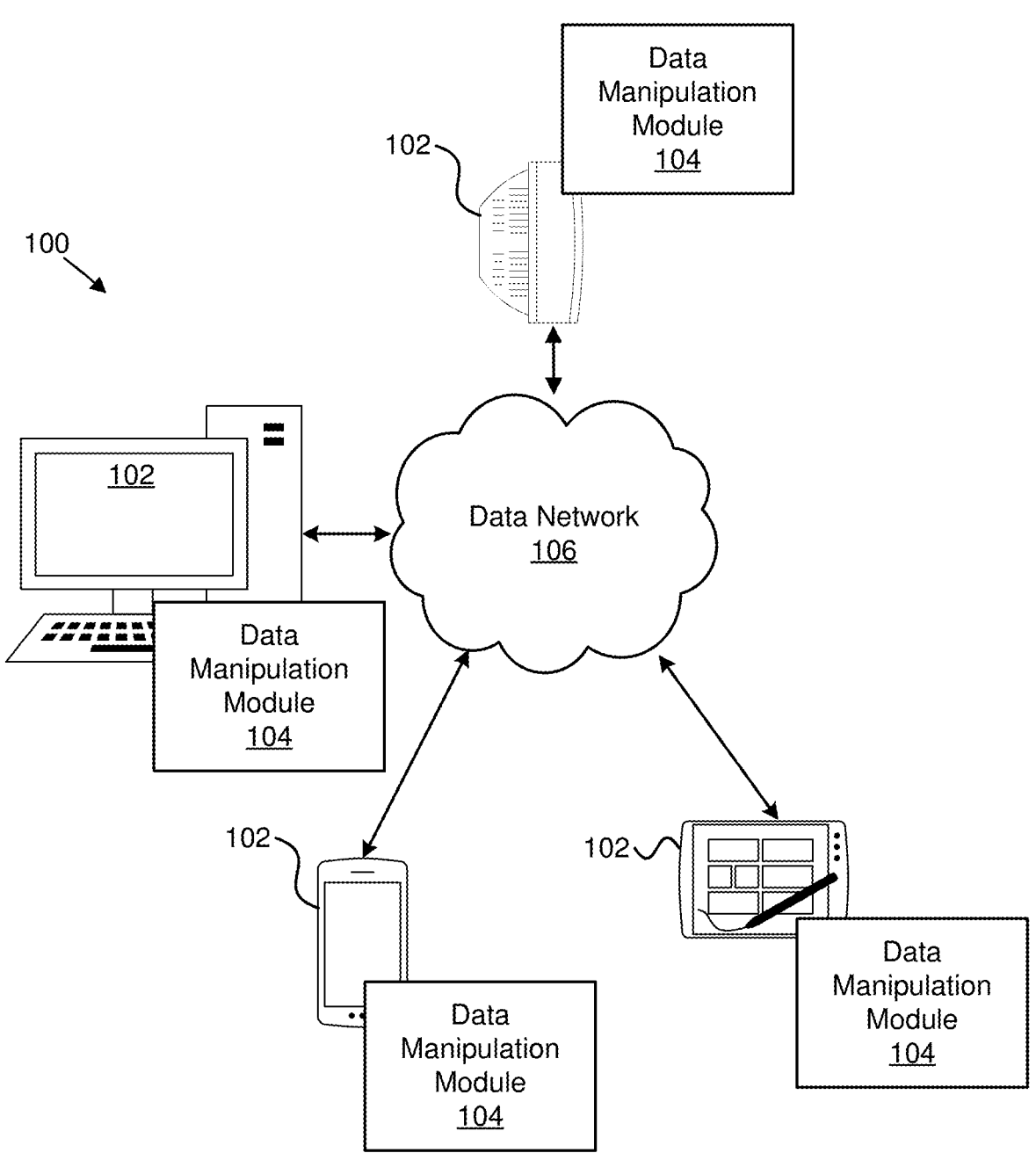
FIG. 1 is a schematic block diagram illustrating one embodiment of a system for producing synthetic fake data.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/ acts specified in the flowchart and/or block diagram block or blocks.

The schematic flowchart diagrams and/or schematic block diagrams in the Figures illustrate the architecture, function-ality, and operation of possible implementations of appara-tuses, systems, methods and program products according to various embodiments. In this regard, each block in the schematic flowchart diagrams and/or schematic block dia-grams may represent a module, segment, or portion of code, which includes one or more executable instructions of the code for implementing the specified logical function(s).

It should also be noted that, in some alternative imple-mentations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enu-merated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hard-ware and code.

The description of elements in each figure may refer to elements of proceeding figures. Like numbers refer to like elements in all figures, including alternate embodiments of like elements.

FIG. 1 depicts one embodiment of a system 100 for producing synthetic fake data. In one embodiment, the system 100 includes information handling devices 102, data manipulation modules 104, and data networks 106. Even though a specific number of information handling devices 102, data manipulation modules 104, and data networks 106 are depicted in FIG. 1, one of skill in the art will recognize that any number of information handling devices 102, data manipulation modules 104, and data networks 106 may be included in the system 100.

In one embodiment, the information handling devices 102 include computing devices, such as desktop computers, laptop computers, personal digital assistants (PDAs), tablet computers, smart phones, cellular phones, smart televisions (e.g., televisions connected to the Internet), set-top boxes, game consoles, security systems (including security cam-eras), vehicle on-board computers, network devices (e.g., routers, switches, modems), streaming devices, digital assistants (e.g., public digital assistants), or the like. In some embodiments, the information handling devices 102 include wearable devices, such as smart watches, fitness bands, optical head-mounted displays, or the like. The information handling devices 102 may access the data network 106 directly using a network connection.

The information handling devices 102 may include an embodiment of the data manipulation module 104. In certain embodiments, the data manipulation module 104 may receive, by use of the at least one processor (e.g., processor 202), real data to be protected. The data manipulation module 104 may also add noise to the real data to produce synthetic fake data. The data manipulation module 104 may encrypt the synthetic fake data using an encryption key. In this manner, the data manipulation module 104 may be used for producing synthetic fake data.

The data network 106, in one embodiment, includes a digital communication network that transmits digital com-munications. The data network 106 may include a wireless network, such as a wireless cellular network, a local wireless network, such as a Wi-Fi network, a Bluetooth® network, a near-field communication ("NFC") network, an ad hoc net-work, and/or the like. The data network 106 may include a WAN, a storage area network ("SAN"), a LAN, an optical fiber network, the internet, or other digital communication network. The data network 106 may include two or more networks. The data network 106 may include one or more servers, routers, switches, and/or other networking equip-ment. The data network 106 may also include computer readable storage media, such as a hard disk drive, an optical drive, non-volatile memory, RAM, or the like.

Figure 2:
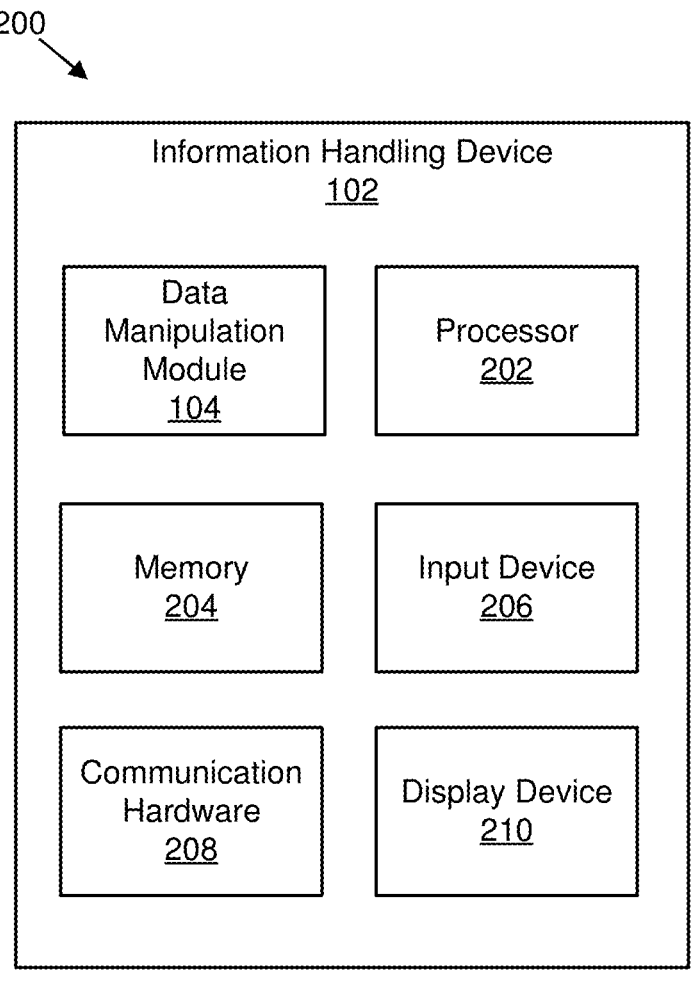
FIG. 2 is a schematic block diagram illustrating one embodiment of an apparatus including an information handling device.

FIG. 2 depicts one embodiment of an apparatus 200 that may be used for producing synthetic fake data. The appa-ratus 200 includes one embodiment of the information handling device 102. Furthermore, the information handling device 102 may include the data manipulation module 104, a processor 202, a memory 204, an input device 206, communication hardware 208, and optionally a display device 210. In some embodiments, the input device 206 and the display device 210 are combined into a single device, such as a touchscreen.

The processor 202, in one embodiment, may include any known controller capable of executing computer-readable instructions and/or capable of performing logical operations. For example, the processor 202 may be a microcontroller, a microprocessor, a central processing unit ("CPU"), a graph-ics processing unit ("GPU"), an auxiliary processing unit, a field programmable gate array ("FPGA"), or similar pro-grammable controller. In some embodiments, the processor 202 executes instructions stored in the memory 204 to perform the methods and routines described herein. The processor 202 is communicatively coupled to the memory 204, the data manipulation module 104, the input device 206, the communication hardware 208, and the display device 210.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile com-puter storage media. For example, the memory 204 may include a hard disk drive, a flash memory, or any other suitable non-volatile computer storage device. In some embodiments, the memory 204 includes both volatile and non-volatile computer storage media.

In some embodiments, the memory 204 stores configuration information. In some embodiments, the memory 204 also stores program code and related data, such as an operating system or other controller algorithms operating on the information handling device 102.

The information handling device 102 may use the data manipulation module 104 for producing synthetic fake data. As may be appreciated, the data manipulation module 104 may include computer hardware, computer software, or a combination of both computer hardware and computer software. For example, the data manipulation module 104 may include circuitry, or the processor 202, used to receive, by use of at least one processor (e.g., the processor 202), real data to be protected. As another example, the data manipulation module 104 may include computer program code that adds noise to the real data to produce synthetic fake data. As a further example, the data manipulation module 104 may include computer program code that encrypts the synthetic fake data using an encryption key.

The input device 206, in one embodiment, may include any known computer input device including a touch panel, a button, a keyboard, a stylus, a microphone for receiving audio input (e.g., or another audio input device for receiving audio input), or the like. In some embodiments, the input device 206 may be integrated with the display device 210, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel. The communication hardware 208 may facilitate communication with other devices. For example, the communication hardware 208 may enable communication via Bluetooth®, Wi-Fi, and so forth.

The display device 210, in one embodiment, may include any known electronically controllable display or display device. The display device 210 may be designed to output visual, audible, and/or haptic signals. In some embodiments, the display device 210 includes an electronic display capable of outputting visual data to a user. For example, the display device 210 may include, but is not limited to, an LCD display, an LED display, an OLED display, a projector, or a similar display device capable of outputting images, text, or the like to a user. As another, non-limiting, example, the display device 210 may include a wearable display such as a smart watch, smart glasses, a heads-up display, or the like. Further, the display device 210 may be a component of a smart phone, a personal digital assistant, a television, a table computer, a notebook (laptop) computer, a personal computer, a vehicle dashboard, a streaming device, or the like.

In certain embodiments, the display device 210 includes one or more speakers for producing sound. For example, the display device 210 may produce an audible alert or notification (e.g., a beep or chime). In some embodiments, the display device 210 includes one or more haptic devices for producing vibrations, motion, or other haptic feedback. For example, the display device 210 may produce haptic feedback upon performing an action.

In some embodiments, all or portions of the display device 210 may be integrated with the input device 206. For example, the input device 206 and display device 210 may form a touchscreen or similar touch-sensitive display. In other embodiments, the display device 210 may be located near the input device 206. In certain embodiments, the display device 210 may receive instructions and/or data for output from the processor 202 and/or the data manipulation module 104.

In various embodiments, as data security and privacy preserving becomes more important, people pay special attention to their sensitive data. In daily life, individuals often encounter a situation in which they want an expert to help analyze their sensitive data, but they may be worried that the expert may be compromised and leak sensitive data. In other words, if sensitive data is sent to others, control of the data may be lost.

In certain embodiments, to prevent any third party from eavesdropping on sensitive data through transmission, end-to-end encryption may be used. However, end-to-end encryption may not prevent a receiver from disclosing a sender's sensitive data sometime later. After a sender sends data to a receiver, the sender may lose control of sensitive data. In some embodiments, a receiver is requested to sign a document, such as confidentiality agreements, to promise not to disclose the sender's data. In various embodiments, a receiver of data may take a risk by revealing the sender's sensitive data on purpose, or the receiver of data may not protect the sender's sensitive data properly, and a leakage of data may happen. It should be noted that encryption methods and legal constraints on their own may not prevent a receiver of data from compromising that data.

In some embodiments, a user of an information handling device 102 may desire to improve security of data by an information handling device 102 not providing exact sensitive data. Described herein are various embodiments that use a data manipulation module 104 to produce synthetic fake data.

Figure 3:
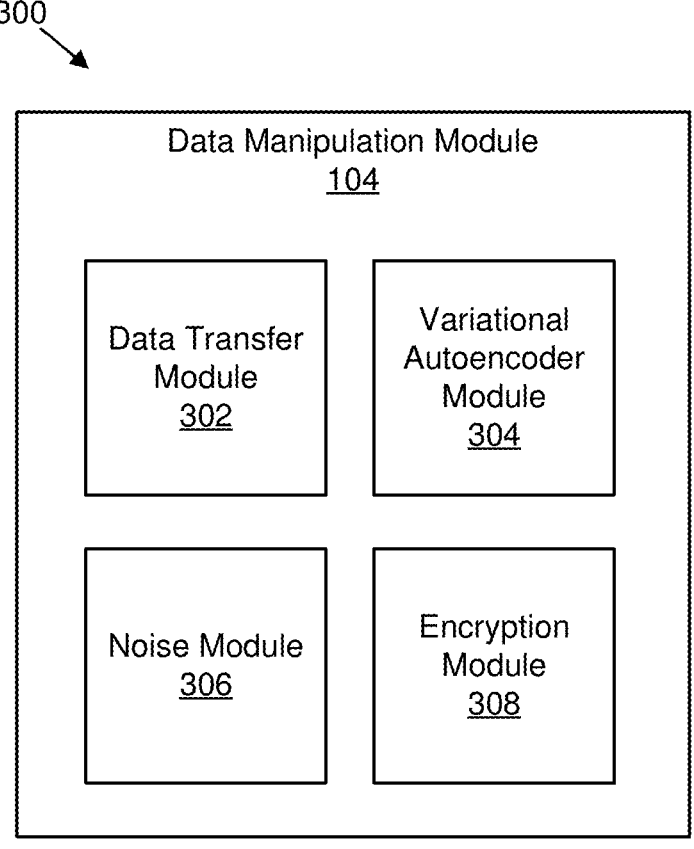
FIG. 3 is a schematic block diagram illustrating one embodiment of an apparatus including a data manipulation module.

FIG. 3 depicts a schematic block diagram illustrating one embodiment of an apparatus 300 (e.g., information handling device 102) that includes one embodiment of the data manipulation module 104. Furthermore, the data manipulation module 104 includes a data transfer module 302, a variational autoencoder module 304, a noise module 306, and an encryption module 308.

In certain embodiments, the data transfer module 302 may receive, by use of at least one processor (e.g., the processor 202), real data to be protected. In various embodiments, the data transfer module 302 may receive encrypted synthetic fake data. In some embodiments, the data transfer module 302 may output (e.g., transmit) encrypted synthetic fake data and/or output (e.g., transmit) synthetic data.

Figure 4:
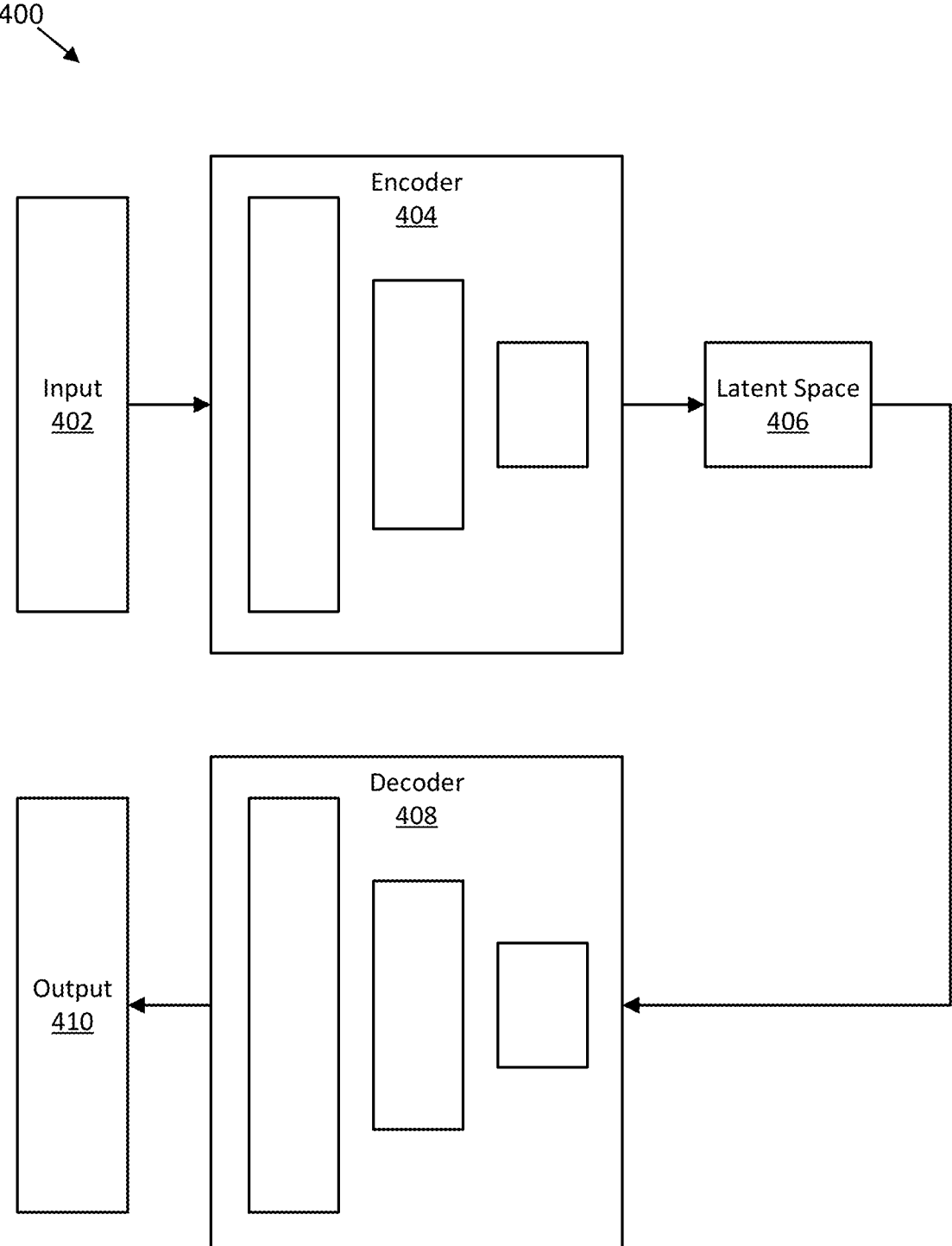
FIG. 4 is a schematic block diagram illustrating one embodiment of an architecture of a variational autoencoder.
Figure 5:
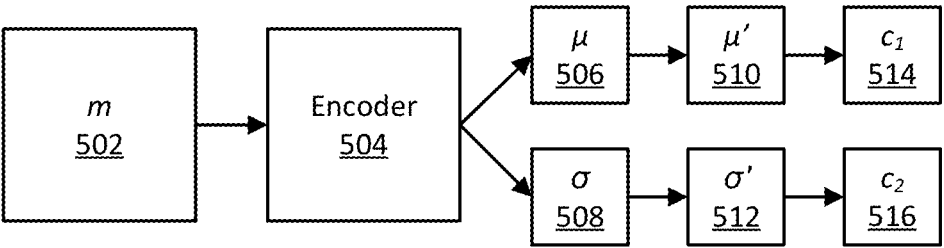
FIG. 5 is a schematic block diagram illustrating one embodiment of a system for producing encrypted synthetic fake data.

In one embodiment, the variational autoencoder module 304 may encode data as further described in FIGS. 4 and 5. In some embodiments, the variational autoencoder module 304 may be used to train a variational autoencoder. In various embodiments, the variational autoencoder may form a vector of means and a vector of standard deviations.

In various embodiments, the noise module 306 may add noise to the real data to produce synthetic fake data. In certain embodiments, the noise may be Gaussian noise. In various embodiments, adding noise may include forming a vector of means and a vector of standard deviations from real data, wherein the noise is added to the vector of means and to the vector of standard deviations. In some embodiments, adding noise to real data to produce the synthetic fake data includes adding the noise using a random vector. In some embodiments, the noise module 306 may remove noise from decrypted synthetic fake data. In such embodiments, the noise may be removed from a vector of means and a vector of standard deviations.

In some embodiments, the encryption module 308 may encrypt the synthetic fake data using an encryption key. In such embodiments, encrypting the synthetic fake data using the encryption key may include separately encrypting a vector of means and a vector of standard deviations after noise is added to the vector of means and the vector of standard deviations. In various embodiments, the encryption key includes a private encryption key. In certain embodiments, the encryption key includes a public encryption key. In some embodiments, the encryption module 308 may decrypt encrypted synthetic fake data to produce decrypted synthetic fake data. In such embodiments, the encrypted synthetic fake data includes a vector of means and a vector of standard deviations.

In one embodiment, a sender (e.g., Alice) of data may send generated synthetic fake data that mimics real original sensitive data to a receiver (e.g., Bob). The receiver (e.g., Bob) only analyzes the synthetic fake data and can still give the sender accurate analysis results. However, if the receiver's data is compromised, the receiver does not have the sender's real data. The only thing that can be revealed by the receiver is generated synthetic fake data.

In some embodiments, a variational autoencoder is used for encryption. In various embodiments, there may be a new encryption mode called privacy-preserving generative encryption ("GE") which may provide encryption and privacy protection simultaneously.

In various embodiments, a variational autoencoder is a kind of generative adversary networks ("GAN") which may generate new synthetic samples according to input samples. FIG. 4 shows a simple architecture of a variational autoencoder.

Specifically, FIG. 4 is a schematic block diagram illustrating one embodiment of an architecture of a variational autoencoder 400. The variational autoencoder 400 includes an input 402 that is provided to an encoder 404. The output from the encoder 404 is provided to a latent space 406 (e.g., encoded space). Further, a sampling from the latent space 406 is provided to a decoder 408, which provides an output 410.

In FIG. 4, the encoder 404 compresses data received from the input 402, and the decoder 408 decompresses data and reconstructs new data. Further, the encoder 404 may encode inputs as distributions instead of points. The encoded latent space 406 is continuous and regularized to be close to a standard Gaussian distribution. The output of encoder 404 constitutes two vectors, a vector of means $\mu$, and a vector of standard deviations $\sigma$.

In some embodiments of the variational autoencoder 400, the encoder 404 is a neural network. Moreover, the input 402 of the encoder 404 is a datapoint x and the output of the encoder 404 is a hidden representation z. Further, the encoder 404 has weights and a bias $\theta$. In various embodiments, the encoder 404 may be denoted as $$q_\theta\left(\frac{z}{x}\right).$$

In certain embodiments, the decoder 408 is another neural network. The input to the decoder 408 is the representation z and has weights and a bias $\phi$. In some embodiments, the decoder 408 may be denoted by $$p_\phi\left(\frac{x}{z}\right).$$

In certain embodiments, a goal of the variational autoencoder 400 is to minimize a reconstruction error between reconstructed (e.g., encoded-decoded) data and the initial input data. In such embodiments, a loss function L for datapoint $x_i$ is:

$$L(\theta, \phi, x_i) = -E_{Zq_\theta\left(\frac{z}{xi}\right)}\left[\log p_\phi\left(\frac{x_i}{z}\right)\right] + KL\left(q_\theta\left(\frac{z}{x_i}\right)p(z)\right).$$

The first term $$\left(-E_{Zq_\theta\left(\frac{z}{xi}\right)}\left[\log p_\phi\left(\frac{x_i}{z}\right)\right]\right)$$

in the function L is a reconstruction loss, or expected negative log-likelihood of the i-th datapoint. One expectation may be taken with respect to the encoder's 404 distribution over the representations. The first term encourages the decoder 408 to learn to reconstruct the data. The second term $$\left(KL\left(q_\theta\left(\frac{z}{x_i}\right)p(z)\right)\right)$$

in the function L is a regularizer. This term is the Kullback-Leibler divergence between the encoder's 404 distribution $$q_\theta\left(\frac{z}{x_i}\right) \text{ and } p(z).$$

This divergence measures how much information is lost when using q to represent p. In the variational autoencoder 400, p is specified as a standard normal distribution with mean 0 and variance 1 (e.g., p(z)=N(0,1)).

In some embodiments, if the encoder 404 outputs representations z that are different than those from a standard normal distribution, the encoder 404 will receive a penalty in loss. This regularizer term helps to keep the representations z of each point to be sufficiently diverse.

FIG. 5 is a schematic block diagram illustrating one embodiment of a system 500 for producing encrypted synthetic fake data. The system 500 includes input data (e.g., sensitive data) m 502 (e.g., data from Alice). The data m 502 is provided to an encoder 504 (e.g., variational autoencoder). The encoder 504 outputs a vector of means $\mu$ 506 and a vector of standard deviations $\sigma$ 508 (e.g., variational autoencoder encodings). Further, noise is added to the vector of means $\mu$ 506 and the vector of standard deviations $\sigma$ 508 to result in $\mu'$ 510 and $\sigma'$ 512. Moreover, $\mu'$ 510 and $\sigma'$ 512 are encrypted to result in $c_1$ 514 and $c_2$ 516.

Figure 6:
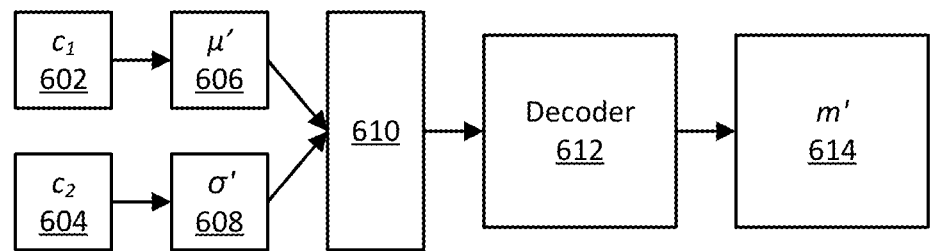
FIG. 6 is a schematic block diagram illustrating one embodiment of a system for extracting data from encrypted synthetic fake data.

FIG. 6 is a schematic block diagram illustrating one embodiment of a system 600 for extracting data from encrypted synthetic fake data. The system 600 includes encrypted data $c_1$ 602 and $c_2$ 604. The encrypted data $c_1$ 602 and $c_2$ 604 is decrypted to result in decrypted encodings $\mu'$ 606 and $\sigma'$ 608. The decrypted encodings $\mu'$ 606 and $\sigma'$ 608 are sampled via a sampler 610. Then, the sampler 610 outputs the sampling to a decoder 612. The decoder 612 generates fake data (e.g., synthetic) that is output as m' 614.

In some embodiments, to design a GE scheme, an encoder 504/decoder 612 (e.g., variational autoencoder) is developed. The encoder 504/decoder 612 is used to sandwich target encryption schemes. In doing so, the outputs of the GE decryption algorithm generates synthetic fake data, not real data.

In one example, a privacy-preserving GE scheme includes the following steps:

In a first step, a sender (e.g., Alice) trains a variational autoencoder and obtains an encoder. If the sender does not have enough data to train the variational autoencoder, the sender may collect public data for augmentation or may find an existing variational autoencoder to initialize a variational autoencoder (e.g., transfer learning).

In a second step, the sender and the receiver generate keys for encryption and decryption. This may be done under either a private-key exchange (e.g., for private-key encryption (symmetric encryption)) or a public-key infrastructure (e.g., for public-key encryption (asymmetric encryption)).

In a third step, the sender uses the encoder of the trained variational autoencoder on target data to be sent to the receiver, outputs two parts of encodings, adds Gaussian noise to the encodings, then uses the sender's key to encrypt the encodings as ciphertexts. The sender sends the ciphertexts along with parameters of the decoder of the variational autoencoder to the receiver.

In a fourth step, the receiver uses its decryption key to decrypt the ciphertexts to obtain the encodings, then uses the decoder to decode the encodings.

It should be noted that, by using privacy-preserving GE, what the receiver can decrypt is generated synthetic fake data according to the sender's original data. Therefore, the receiver can only get the sender's generated synthetic fake data, not the sender's original real data. By analyzing synthetic data, the receiver can still give the sender quite accurate analysis results and at the same time protect the sender's original data.

In the third step, a differentially-private variational autoencoder may be determined by adding Gaussian noise to encodings. The algorithm to add noise to the data may be performed as follows. The input for adding noise includes an encoded vector of means $(\mu_0, \mu_1, \mu_2, \ldots, \mu_{n-1})$ and an encoded vector of standard deviations $(\sigma_0, \sigma_1, \sigma_2, \ldots, \sigma_{n-1})$. Further, for noise level vectors $(\sigma'_0, \sigma'_1, \sigma'_2, \ldots, \sigma'_{n-1})$ and $(\sigma''_0, \sigma''_1, \sigma''_2, \ldots, \sigma''_{n-1})$, $N(0, \sigma'_i)$ is the normal (e.g., Gaussian) distribution with mean 0 and standard deviation $\sigma'_i$; likewise $N(0, \sigma''_i)$ is the normal (e.g., Gaussian) distribution with mean 0 and standard deviation $\sigma''_i$. Further, there is a norm bond C.

In some embodiments, there may be a clip encodings norm to a threshold C. For example, if $\|u_i\|_2 \leq C$, then $u_i$ would be reserved, whereas if $\|u_i\| > C$, then $u_i$ would be clipped to be norm of C.

Moreover, for i in range (0, n), for each $$u_i : u_i \leftarrow u_i / \max\left(1, \frac{\|u_i\|_2}{C}\right),$$

and for each $$\sigma_i : \sigma_i \leftarrow \sigma_i / \max\left(1, \frac{\|\sigma_i\|_2}{C}\right).$$

Further, Gaussian noise may be added as follows: a random vector $(r_0, r_1, r_2, \ldots, r_{n-1})$, with items 0 or 1, a ratio $p \in (0,1)$, number of 1 is $n*p$, and number of 0 is $n*(1-p)$.

Moreover, for i in a range (0,n), for each $u_i$: $u_i = u_i + r_i * N(0, C\sigma'_i)$ and for each $\sigma_i$: $\sigma_i = \sigma_i + r_i * N(0, C\sigma''_i)$. The output after noise is added includes noised encoding vectors $(\mu_0, \mu_1, \mu_2, \ldots, \mu_{n-1})$ and $(\sigma_0, \sigma_1, \sigma_2, \ldots, \sigma_{n-1})$.

Figure 7:
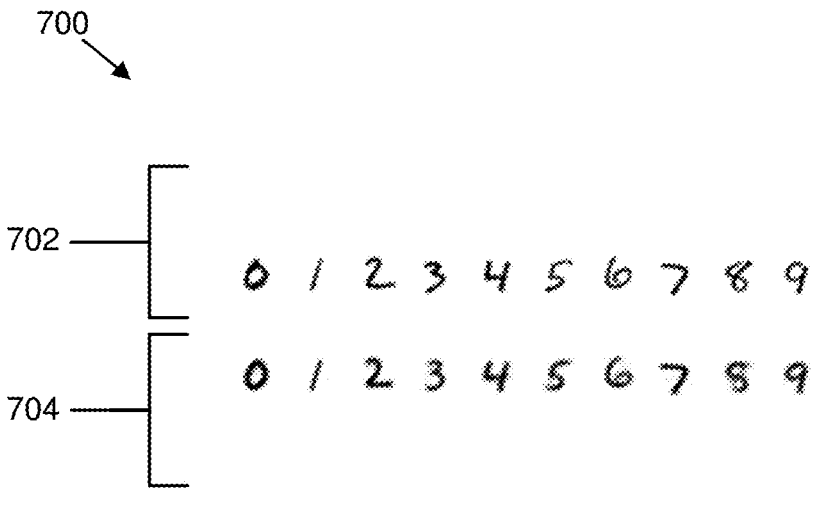
FIG. 7 is a diagram illustrating one embodiment of input data and output data.

FIG. 7 is a diagram illustrating one embodiment 700 of input data 702 and output data 704. The input data 702 is real data provided by a sender to the system 500 (e.g., m 502), and the output data 704 is synthetic (e.g., fake) data created at a receiver of the system 600 (e.g., m' 614). The input data 702 may be actual handwriting from a user, wherein the output data 704 is not exactly the handwriting of the user.

Figure 8:
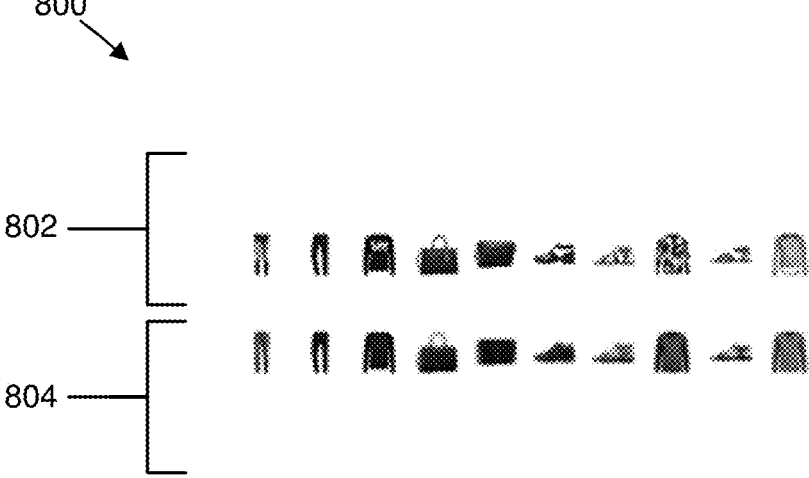
FIG. 8 is a diagram illustrating another embodiment of input data and output data.

FIG. 8 is a diagram illustrating another embodiment 800 of input data 802 and output data 804. The input data 802 is real data provided by a sender to the system 500 (e.g., m 502), and the output data 804 is synthetic (e.g., fake) data created at a receiver of the system 600 (e.g., m' 614). The input data 802 may be actual images with details, wherein the output data 804 is blurred images that has details removed/obscured.

Figure 9:
FIG. 9 is a schematic flow chart diagram illustrating an embodiment of a method for producing synthetic fake data.
Figure 9:
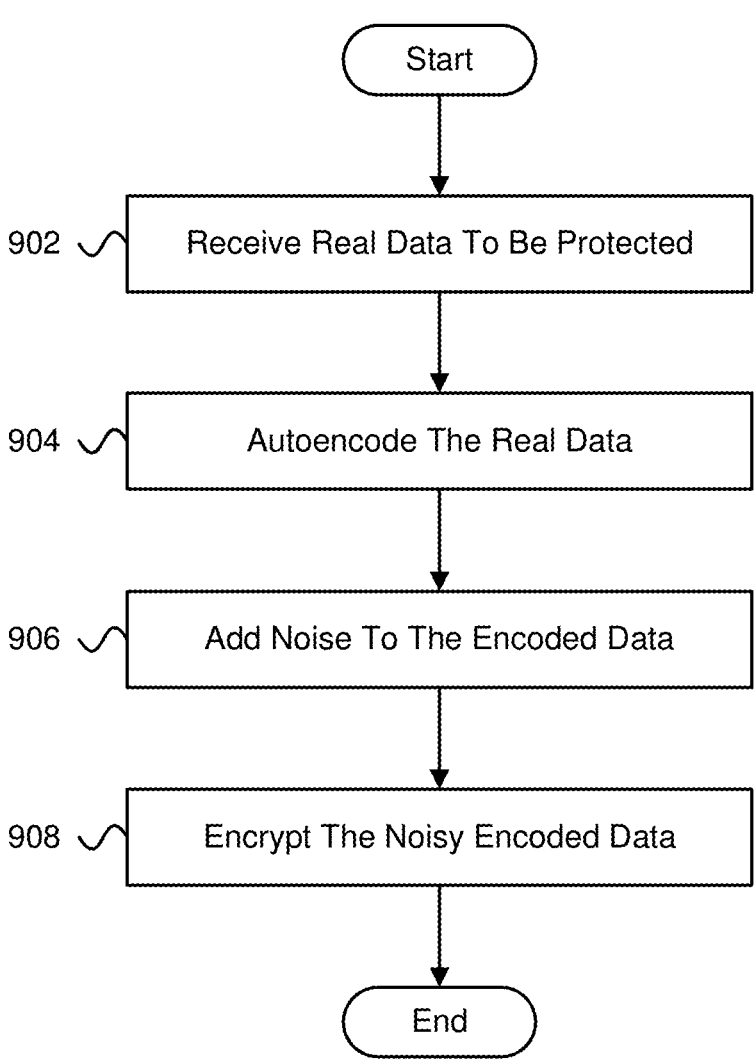

FIG. 9 is a schematic flow chart diagram illustrating an embodiment of a method 900 for producing synthetic fake data. In some embodiments, the method 900 is performed by an apparatus, such as the information handling device 102. In other embodiments, the method 900 may be performed by a module, such as the data manipulation module 104. In certain embodiments, the method 900 may be performed by a processor executing program code, for example, a micro-controller, a microprocessor, a CPU, a GPU, an auxiliary processing unit, a FPGA, or the like.

The method 900 may include receiving 902 real data to be protected. In certain embodiments, the data transfer module 302 may receive 902 the real data to be protected. The method 900 may include autoencoding 904 the real data. In some embodiments, the variational autoencoder module 304 may autoencode 904 the real data.

The method 900 may include adding 906 noise to the real data to produce synthetic fake data. In some embodiments, the noise module 306 may add 906 the noise to the real data. The method 900 may encrypt 908 the noisy encoded data. In some embodiments, the encryption module 308 may encrypt 908 the noisy encoded data.

Figure 10:
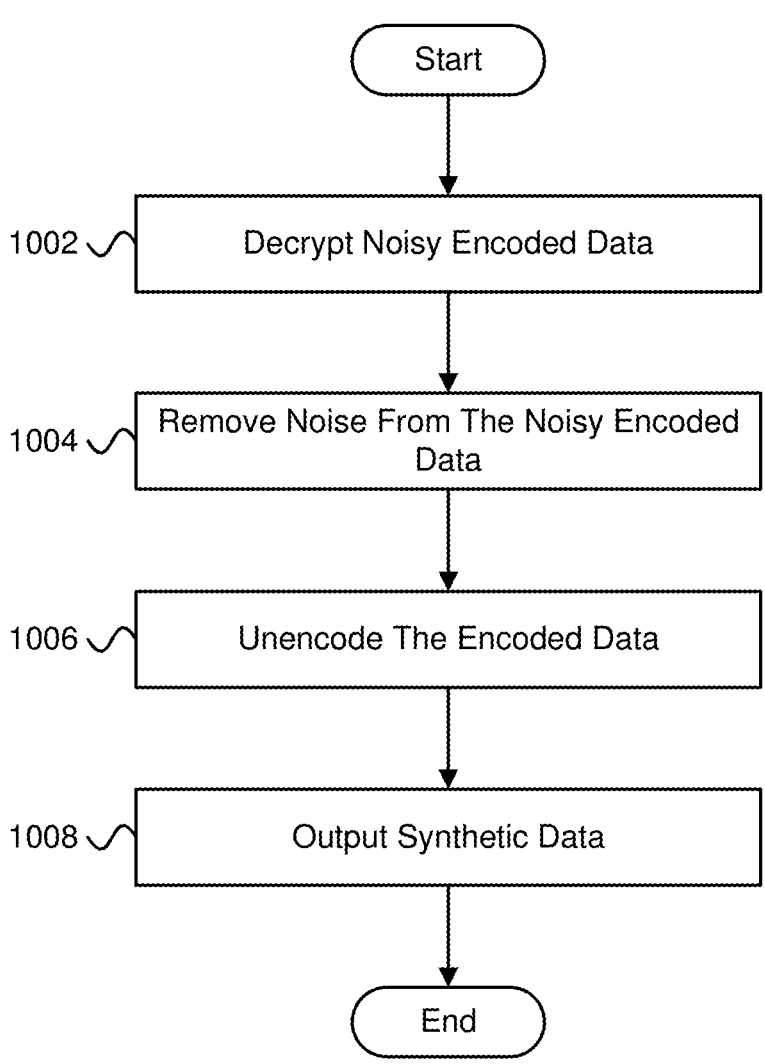
FIG. 10 is a schematic flow chart diagram illustrating an embodiment of a method for extracting data from encrypted synthetic fake data.

FIG. 10 is a schematic flow chart diagram illustrating an embodiment of a method 1000 for extracting data from encrypted synthetic fake data. In some embodiments, the method 1000 is performed by an apparatus, such as the information handling device 102. In other embodiments, the method 1000 may be performed by a module, such as the data manipulation module 104. In certain embodiments, the method 1000 may be performed by a processor executing program code, for example, a microcontroller, a microprocessor, a CPU, a GPU, an auxiliary processing unit, a FPGA, or the like.

The method 1000 may include decrypting 1002 noisy encoded data. In some embodiments, the encryption module 308 may decrypt 1002 the noisy encoded data. The method 1000 may include removing 1004 noise from the noisy encoded data. In some embodiments, the noise module 306 may remove 1004 noise from the noisy encoded data.

The method 1000 may include unencoding 1006 the encoded data. In some embodiments, the variational autoencoder module 304 may unencode 1006 the encoded data. The method 1000 may include outputting 1008 synthetic data. In certain embodiments, the data transfer module 302 may output 1008 the synthetic data.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:

at least one processor; and a memory that stores code executable by the at least one processor to:

receive, by use of the at least one processor, real data to be protected;

encode the real data by forming a vector of means and a vector of standard deviations of the real data;

add noise directly to the vector of means and independently add noise to the vector of standard deviations to produce synthetic fake data; and encrypt the synthetic fake data using an encryption key.

2. The apparatus of claim 1, further comprising a transmitter to transmit the encrypted synthetic fake data.

3. The apparatus of claim 1, wherein the vector of means and the vector of standard deviations are formed using a variational autoencoder.

4. The apparatus of claim 1, wherein the code executable by the at least one processor to add the noise to the real data to produce the synthetic fake data comprises code executable by the at least one processor to add the noise using a random vector.

5. A method comprising:

receiving, by use of at least one processor, real data to be protected;

encoding the real data by forming a vector of means and a vector of standard deviations of the real data;

adding noise directly to the vector of means and independently add noise to the vector of standard deviations to produce synthetic fake data; and encrypting the synthetic fake data using an encryption key.

6. The method of claim 5, further comprising transmitting the encrypted synthetic fake data.

7. The method of claim 5, wherein the noise comprises Gaussian noise.

8. The method of claim 5, wherein encrypting the synthetic fake data using the encryption key comprises separately encrypting the vector of means and the vector of standard deviations after the noise is added to the vector of means and the vector of standard deviations.

9. The method of claim 5, wherein the vector of means and the vector of standard deviations are formed using a variational autoencoder.

10. The method of claim 9, further comprising training the variational autoencoder.

11. The method of claim 5, wherein adding the noise to the real data to produce the synthetic fake data comprises adding the noise using a random vector.

12. The method of claim 5, wherein the encryption key comprises a private encryption key.

13. The method of claim 5, wherein the encryption key comprises a public encryption key.

14. A method comprising:

receiving, by use of at least one processor, encrypted synthetic fake data;

decrypting the encrypted synthetic fake data to produce decrypted synthetic fake data, wherein the encrypted synthetic fake data comprises a vector of means and a vector of standard deviations of real data formed by encoding the real data; and removing noise from the decrypted synthetic fake data to produce synthetic fake data, wherein the noise is removed from the vector of means and the vector of standard deviations separately.

15. The method of claim 14, wherein the noise comprises Gaussian noise.

16. The method of claim 14, further comprising unencoding the synthetic fake data to produce extracted data.

17. The method of claim 16, further comprising outputting the extracted data.

* * * * *